March 5, 1935.  L. M. RICHARDS  1,993,455
ELECTRIC WELDING GENERATOR
Filed July 24, 1930
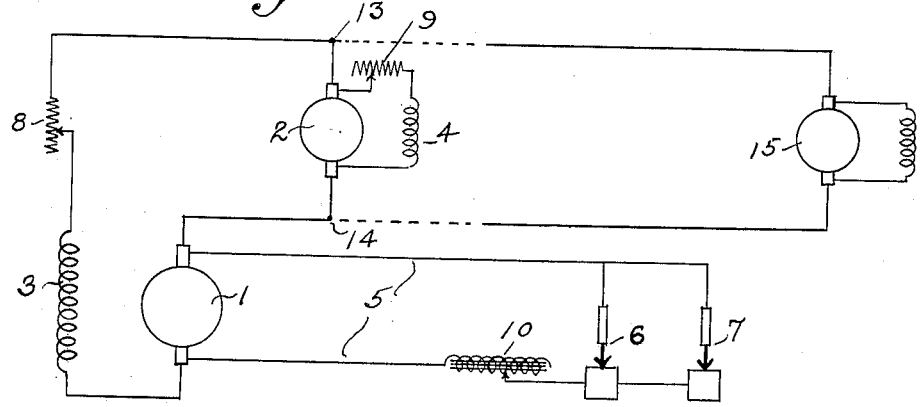
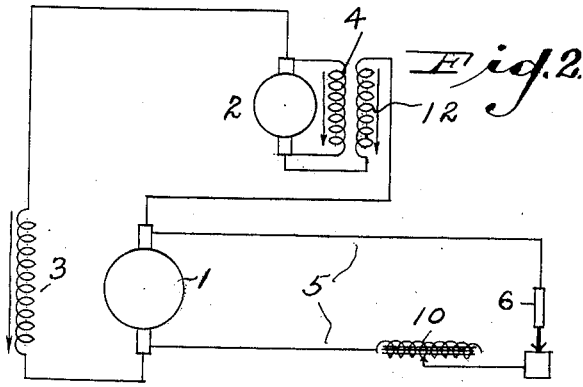
Inventor
Lee M. Richards
By
Attorney Patented Mar. 5, 1935

1,993,455

UNITED STATES PATENT OFFICE 1,993,455

ELECTRIC WELDING GENERATOR

Lee M. Richards, Dayton, Ohio, assignor to The Master Electric Company, Dayton, Ohio, a corporation of Ohio Application July 24, 1930, Serial No. 470,349

5 Claims. (Cl. 171—225)

This invention relates to electric generators for use in electric welding systems or the like wherein the generator is subjected to a variable load resistance and particularly to a generator of the shunt-field type which will afford a relatively high arc striking voltage, and a current varying inversely as the voltage, which in turn fluctuates as the resistance of the arc changes during the welding operation thereby maintaining substantially constant wattage with minimum loss of power and affording in the arc the uniform heat necessary to insure a strong homogeneous weld.

Arc welding operations necessitate a generator having a "drooping" voltage characteristic. When not subjected to load, the voltage at the terminals builds up to a relatively high potential, affording the necessary voltage to strike the arc. As load is applied by approach of the electrode to the work, the voltage drops in value to that required to maintain the arc, varying with the variable resistance of such arc.

There are various ways of obtaining this "drooping" voltage characteristic. A resistance of suitable value may be placed in series with the welding arc to which current is supplied from a constant potential source. Such arrangement is uneconomical since too great a proportion of the current supply is dissipated through the resistance and is unavailable for useful work. Another method of achieving the "drooping" voltage characteristic is by use of a field winding in series with the load, so connected as to oppose the main shunt field. Such construction is expensive and presents manufacturing difficulties, and moreover is inefficient due to losses in the series field. A further method of obtaining the desired "drooping" voltage characteristic is by means of two shunt windings, one of which is self-excited, and the other separately excited. This also involves expensive production operations. A self-excited winding alone is unreliable, as such self-excited generator sometimes fails to build up the necessary voltage and does not produce a suitable "drooping" voltage characteristic. The objections to these various methods of operation are overcome by the hereinafter described construction.

In the present generator construction there are employed a generator armature and an exciter armature connected in series with each other and with a single shunt field winding of the main generator. Thus the field of the main generator is both self and separately excited by the combined voltage of the two armatures. The current setting is controlled by a rheostat either in the main field circuit or in the exciter shunt circuit. For some conditions of use, both a series and shunt winding in the exciter field or in the main field are found desirable.

The object of the invention is to simplify the construction as well as the means and mode of operation of electric welding generators and the like, whereby they will not only be cheapened in construction but will be more efficient in operation, uniform in action, and capable of producing strong welds with ease of operation by moderately skilled workmen.

A further object of the invention is to obviate the necessity for relatively large and heavy reactance in the welding circuit with its increased weight and cost.

A further object of the invention is to provide a generator affording high initial striking voltage and constant wattage at variable potential proportionate to the resistance of the maintained arc.

A further object of the invention is to provide a generator which will very quickly adjust itself to sudden changes in the loading circuit by automatically increasing and decreasing the voltage as the resistance of the load increases or decreases, thus maintaining within reasonable limits a relatively constant heat in the arc.

A further object of the invention is to provide means for insuring maintenance of proper polarity of the exciter armature.

A further and important object of the invention is to minimize the power losses of welding generators.

A further object of the invention is to provide a construction which will involve minimum manufacturing difficulties and production problems, and which will be economical in operation.

With the above primary and other incidental objects in view, as will more fully appear in the specification, the invention consists of the features of construction, the parts and combinations thereof and the mode of operation or their equivalents as hereinafter described and set forth in the claims.

Referring to the drawing, Fig. 1 is a diagrammatic view of the generator and welding circuits embodying the fundamental features of the present invention. Fig. 2 is a similar diagrammatic view illustrating a series winding in the exciter field. Fig. 3 illustrates a further modification wherein the exciter field contains a series winding only.

Like parts are indicated by similar characters of reference throughout the several views.

In the drawing there is shown a shunt generator, the shunt field of which is both self and separately excited. The generator armature 1 and the exciter armature 2 are connected in series with each other and with a generator field winding 3 included in the shunt circuit connecting the two armatures 1 and 2. This shunt field winding is therefore simultaneously subjected to the combined voltages of both the generator armature 1 and exciter armature 2. The exciter is additionally provided with its individual shunt field winding 4. In lieu of the voltage supplied by the exciter armature, voltage might be supplied from other source of direct current power.

The generator 1 supplies through the operating circuit 5 a variable resistance load consisting of one or more arcs 6 and 7. The welding current supplied to the electrodes may be predetermined and properly proportioned to the size and type of electrode by means of a rheostat 8 located in the common shunt, or in lieu thereof, by a rheostat 9 located in the exciter shunt. Either of the rheostats 8 and 9 may be used to set the current independently of the other rheostat. Since the current flow in the rheostat is small in value and the resistance relatively small, but very small loss is caused by the rheostat. Inasmuch as the main generator armature acts as a regulator, the rheostat is not required for control purposes but only for initially determining the current flow for different welding operations, and is not essential to the proper functioning of the apparatus if the windings are designed and proportioned for the particular load. A reactance 10 may be included in the welding circuit to prevent current surge or sudden changes of current which might otherwise take place at the time of striking the arc or due to arc variation.

The field 3 being under the influence of both armatures 1 and 2 is subjected to a substantially constant degree of excitation by the exciter armature 2 and to a variable degree of excitation by the main generator armature 1, depending upon and varying with the value of the resistance load in the welding circuit. When the welding circuit is open, due to disengagement of the electrode from the work, the terminal voltage builds up to relatively high potential. As soon as the circuit is closed by contact of the electrode with the work, there is a temporary short circuit causing a large amount of current to flow and producing a drop in the voltage from the armature 1. Since the field excitation is the sum of the voltages from the armatures 1 and 2, there is a reduction of the field excitation which causes further drop in the terminal voltage. This holds the current in the arc circuit down to reasonable value on short circuit and on low resistance loads. As the electrode is moved slightly away from the work, an arc is formed which increases the resistance of the load circuit. By such increase of resistance, the current flow through the armature coils is decreased and the voltage is increased at the armature terminals sufficiently to maintain the arc across the higher resistance gap. Accordingly as the arc resistance increases, the strength of the field 3 will increase and tend to maintain the heat of the arc constant. As the flow of current through the arc increases, the strength of the field 3 will decrease, thus reducing the voltage at the arc in accordance with the well-known action of a shunt field, and maintaining within reasonable limits the heat of the arc. This construction has the advantage of quick adjustment to sudden load changes. The influence of the exciter armature upon the controlling field 3 being unaffected by the variation of load resistance, maintains a workable power balance under extreme conditions.

The construction as heretofore described is subject to various modifications and additions without, however, changing its fundamental characteristics.

A further modification is illustrated in Fig. 2 wherein a supplemental winding 12 is interposed between and in series with the armatures 1 and 2. This series field winding may be subjected to the influence of either the main armature 1 or exciter armature 2. It is shown for illustrative purposes as a part of a compound winding for the exciter, while in Fig. 3 it is shown as the only field winding for the exciter armature 2. Such supplemental series field assists in providing additional drop in the generator voltage, and incidentally will tend to maintain proper polarity of the exciter armature.

As before mentioned, direct current from other source may be employed for exciter purpose. In such case the armature 2 and its field winding 4 are omitted and opposite sides of a direct current power line are connected at 13 and 14, as indicated in Fig. 1, which has the effect of disposing the power station armature 15 in the field circuit in series with the main armature 1 and field winding 3 in lieu of the exciter armature 2.

While the use of reactance 10 may be desirable for certain conditions of use, it will ordinarily be unnecessary. By the automatic inverse fluctuations of current and voltage as the arc resistance changes, the machine automatically compensates for resistance variation to such extent that current surge is minimized.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. In a dynamo electric machine of the character described, a pair of generators having the armatures connected in series, a short shunt field winding and a series field winding cumulatively connected supplying excitation to one armature, each of said windings being subject to the influence of both armatures, a second shunt field winding influencing the other armature only so as to produce a drooping voltage characteristic output from said other armature, and a working circuit including a variable resistance load supplied with current from said other armature alone.

2. In a dynamo electric machine of the character described, a pair of generator armatures, a shunt field winding and a series field winding, each subject to the influence of both armatures, and a second field winding pertaining to its armature only and cumulatively connected with respect to said series winding so as to produce a drooping voltage characteristic output from one of said armatures, and a working circuit supplied with current from said armature having a drooping voltage characteristic.

3. In a dynamo electric machine of the character described, a generator, a cumulatively compound wound exciter for said generator, the armature of the generator and the armature of the exciter being connected in series with the series field of said exciter, the shunt winding of the generator being connected in parallel with the armature and in series with the exciter armature, the phase relation of said fields being arranged to maintain proper polarity of the output and arranged to produce a drooping voltage characteristic output from said generator.

4. In a dynamo electric machine having a generator and a shunt wound exciter, the method including the influencing of the armature of said generator by a flux component responsive to the voltage output of said generator and by a flux component responsive to the current output of said exciter, the output of said exciter being influenced by a field responsive exclusively to the potential of said exciter, and a field responsive to the current output of said exciter and the voltage output of said generator so as to produce a voltage output from said generator having a drooping voltage characteristic.

5. In a dynamo for an electric machine of the character described, a shunt-wound generator, a cumulatively compound wound exciter for said generator actuated in series with the shunt winding thereof, the armature of the generator and the armature of the exciter being connected in series with the series field of said exciter and connected in series with the shunt field of said generator so as to produce a drooping voltage output from said generator.

LEE M. RICHARDS.